(12) United States Patent
Alfarhan et al.

(10) Patent No.: US 12,376,129 B2
(45) Date of Patent: Jul. 29, 2025

(54) SUPPLEMENTARY UPLINK TRANSMISSIONS IN WIRELESS SYSTEMS

(71) Applicant: InterDigital Patent Holdings, Inc., Wilmington, DE (US)

(72) Inventors: Faris Alfarhan, Montreal (CA); Mouna Hajir, Montreal (CA); Ghyslain Pelletier, Montreal (CA); J. Patrick Tooher, Montreal (CA); Paul Marinier, Brossard (CA); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/594,780

(22) Filed: Mar. 4, 2024

(65) Prior Publication Data
US 2024/0276507 A1 Aug. 15, 2024

Related U.S. Application Data

(63) Continuation of application No. 16/763,704, filed as application No. PCT/US2018/060685 on Nov. 13, 2018, now Pat. No. 11,956,789.
(Continued)

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0082* (2013.01); *H04W 72/0446* (2013.01);
(Continued)

(58) Field of Classification Search
CPC ............ H04W 72/14; H04W 72/0446; H04W 72/0453; H04W 72/10; H04W 80/02;
(Continued)

(56) References Cited

U.S. PATENT DOCUMENTS 10,334,598 B2    6/2019   Loehr et al.
10,880,916 B2   12/2020   Tang
(Continued)

FOREIGN PATENT DOCUMENTS

JP    2013059050 A    3/2013
JP    2016042701 A    3/2016

OTHER PUBLICATIONS

Third Generation Partnership Project (3GPP), "WF on SUL Operations", 3GPP TSG RAN WG1 Meeting 90bis Prague, CZ, R1-1719112, Oct. 9-13, 2017, 2 pages.
(Continued)

*Primary Examiner* — Yu-Wen Chang
(74) *Attorney, Agent, or Firm* — Flaster Greenberg, P.C.

(57) ABSTRACT

Systems, methods, and instrumentalities are disclosed for uplink (UL) transmissions in wireless systems. The systems, methods and instrumentalities may include a wireless transmit/receive unit (WTRU) with a receiver configured to receive one or more uplink (UL) grants that may include allocations associated with a regular UL (RUL) carrier and a supplementary UL (SUL) carrier. The RUL and SUL carriers may be associated with a common downlink (DL) carrier of a serving cell. The WTRU may include a processor configured to select data from one or more logical channels for transmission in accordance with the allocations. The WTRU may include a transmitter configured to transmit data from one logical channel on the RUL carrier and to transmit data from another logical channel on the SUL carrier in accordance with the allocations.

16 Claims, 8 Drawing Sheets

Related U.S. Application Data

(60) Provisional application No. 62/615,404, filed on Jan. 9, 2018, provisional application No. 62/586,095, filed on Nov. 14, 2017.

(51) Int. Cl.

| | |
|---|---|
| *H04W 72/0446* | (2023.01) |
| *H04W 72/0453* | (2023.01) |
| *H04W 72/56* | (2023.01) |
| *H04W 80/02* | (2009.01) |
| *H04W 80/08* | (2009.01) |

(52) U.S. Cl.
CPC ....... *H04W 72/0453* (2013.01); *H04W 72/56* (2023.01); *H04W 80/02* (2013.01); *H04W 80/08* (2013.01)

(58) Field of Classification Search
CPC ............. H04W 80/08; H04W 72/1268; H04W 72/1226; H04L 5/0082; H04L 5/001
See application file for complete search history.

(56) References Cited

U.S. PATENT DOCUMENTS

| | | | |
|---|---|---|---|
| 2011/0170495 A1 | 7/2011 | Earnshaw et al. | |
| 2016/0050658 A1 | 2/2016 | Tabet et al. | |
| 2017/0318594 A1* | 11/2017 | Babaei ................. | H04W 72/56 |
| 2018/0092122 A1 | 3/2018 | Babaei et al. | |
| 2018/0176937 A1 | 6/2018 | Chen et al. | |
| 2018/0279262 A1* | 9/2018 | Babaei ................. | H04L 1/1848 |
| 2018/0279358 A1 | 9/2018 | Babaei et al. | |
| 2018/0324768 A1 | 11/2018 | Shaheen et al. | |
| 2018/0324833 A1 | 11/2018 | He et al. | |
| 2018/0368133 A1 | 12/2018 | Park et al. | |
| 2019/0261408 A1 | 8/2019 | Lou et al. | |
| 2019/0335448 A1* | 10/2019 | Yang ..................... | H04W 72/21 |
| 2019/0364586 A1 | 11/2019 | Li et al. | |
| 2020/0022094 A1 | 1/2020 | You et al. | |
| 2020/0037345 A1 | 1/2020 | Ryoo et al. | |
| 2020/0068600 A1 | 2/2020 | Yu et al. | |
| 2020/0170035 A1 | 5/2020 | Lee et al. | |
| 2020/0196327 A1 | 6/2020 | Zhang et al. | |
| 2020/0267753 A1 | 8/2020 | Adjakple et al. | |
| 2020/0314888 A1 | 10/2020 | Kolding et al. | |
| 2021/0176740 A1 | 6/2021 | Lee et al. | |
| 2021/0185642 A1 | 6/2021 | Sebire et al. | |

OTHER PUBLICATIONS

Third Generation Partnership Project (3GPP), "LCP for grant-free transmissions", 3GPP TSG-RAN WG2 #99bis, R2-1711423, Prague, The Czech Republic, Oct. 9-13, 2017 Revision of R2-1708101, Oct. 9-13, 2017, 5 pages.

R2-1708622, "LCP procedure for NR", Lenovo, Motorola Mobility, 3GPP TSG RAN WG2 #99, Aug. 11, 2017.

3rd Generation Partnership Project (3GPP), R2-1704397, "Logical Channel Prioritization and Multiple Numerologies", Ericsson, 3GPP TSG-RAN WG2 #98, Hangzhou, P.R. of China, May 15-19, 2017, pp. 1-4.

3rd Generation Partnership Project (3GPP), R2-1709600, "The Impact of Processing Order of UL Grants on LCP", Samsung, 3GPP TSG RAN WG2 #99, Berlin, Germany, Aug. 21-25, 2017, pp. 1-5.

3rd Generation Partnership Project (3GPP), R1-1717097, "HARQ/CSI Feedback and Scheduling Timing for SUL", Huawei, HiSilicon, 3GPP TSG RAN WG1 Meeting 90bis, Prague, Czech Republic, Oct. 9-13, 2017, 7 pages.

3rd Generation Partnership Project (3GPP), R2-1706588, "Details on LCP", Nokia, Alcatel-Lucent Shanghai Bell, 3GPP TSG-RAN WG2 NR Adhoc #2, Qingdao, China, Jun. 27-29, 2017, 2 pages.

3rd Generation Partnership Project (3GPP), R2-1707739, "Parameters in the Profile for LCP", OPPO, 3GPP TSG RAN WG2 #99, Berlin, Germany, Aug. 21-25, 2017, pp. 1-3.

3rd Generation Partnership Project (3GPP), R2-1711029, "LCP Procedure for NR", Lenovo, Motorola Mobility, 3GPP TSG-RAN WG2 Meeting #99bis, Prague, Czech Republic, Oct. 9-13, 2017, 6 pages.

3rd Generation Partnership Project (3GPP), R2-1711824, "Considerations on Support of Supplementary Uplink Frequency", CMCC, 3GPP TSG-RAN WG2 Meeting #99bis, Prague, Czech Republic, Oct. 9-13, 2017, 6 pages.

* cited by examiner

SUPPLEMENTARY UPLINK TRANSMISSIONS IN WIRELESS SYSTEMS

CROSS-REFERENCE TO RELATED APPLICATIONS

This application is the continuation of U.S. Non-Provisional application Ser. No. 16/763,704, filed May 13, 2020, which is the National Stage Entry under 35 U.S.C. § 371 of Patent Cooperation Treaty Application No. PCT/US2018/060685, filed Nov. 13, 2018, which claims the benefit of U.S. Provisional Application No. 62/586,095, filed Nov. 14, 2017, and U.S. Provisional Application No. 62/615,404, filed Jan. 9, 2018, the contents of both of which are hereby incorporated herein by reference in their entirety.

BACKGROUND

Mobile devices in wireless communications systems may be configured to operate with an uplink (UL) carrier in a given cell. The UL carrier may be associated with a downlink (DL) carrier in the same cell. To the extent a mobile device may be configured with more than one UL carrier, each may be associated with a different DL carrier from a different cell. That is, there may be a one-to-one correspondence between the UL and DL carriers configured in the mobile device. Increasing the number of available UL carriers for a given DL carrier may increase wireless performance, such as the reliability of the mobile device's UL transmissions. For example, if one of the available UL carriers operates at a higher frequency than another, the mobile device may be able to extend its transmission range by selecting the lower frequency UL carrier. However, adding such additional UL carriers presents new technical challenges, including configuring the mobile device to manage the additional UL carriers when processing data for UL transmission.

SUMMARY

Systems, methods, and instrumentalities are disclosed for uplink (UL) transmissions in wireless systems. The systems, methods and instrumentalities may include a wireless transmit/receive unit (WTRU) with a receiver that is configured to receive one or more UL grants. The one or more UL grants may be received via a common downlink (DL) carrier of a serving cell. The uplink grant(s) may include an allocation associated with a regular UL (RUL) carrier and an allocation associated with a supplementary UL (SUL) carrier. The RUL and SUL carriers may be associated with the common DL carrier of the serving cell. The RUL carrier's frequency may be greater than the SUL carrier's frequency. The SUL carrier's coverage area may be greater than the RUL carrier's coverage area.

The WTRU may include a processor that is configured to select data from one or more logical channels for transmission in accordance with the allocations in the one or more UL grants. For example, one logical channel may be selected based on at least an allocation being associated with the RUL carrier and another logical channel may be selected based on at least another allocation being associated with the SUL carrier. The WTRU may include a transmitter that is configured to transmit data from the one logical channel on the RUL carrier and to transmit data from the other logical channel on the SUL carrier in accordance with the respective allocations. The transmission of data on the RUL carrier and the transmission of data on the SUL carrier may at least partially overlap in time and/or may occur during different time intervals.

The data from at least one logical channel may be restricted to being transmitted on the RUL carrier and data from at least another logical channel may be restricted to being transmitted on the SUL carrier. In accordance with another allocation, the data from at least the other logical channel may be selected for transmission on both the RUL and SUL carriers. In accordance with yet another allocation, the data from at least the other logical channel may be selected for transmission on the RUL carrier if a quality of the serving cell is above a threshold and on the SUL carrier if the quality of the serving cell is below the threshold. In accordance with another allocation, the processor may be configured to select either the RUL carrier or the SUL carrier for transmission of data from one or more logical channels based on one or more of a timing requirement of the data, a transmission type of the data, a sub carrier spacing (SCS) requirement of the data, a wireless service type of the data, a total size of data available for transmission, an explicit indication in the one or more UL grants, a redundancy version (RV) of a transmission of the data, a mobility or speed of the WTRU, or a quality of service (QOS) requirement of the data.

BRIEF DESCRIPTION OF THE DRAWINGS

Like reference numerals in the figures indicate like elements.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
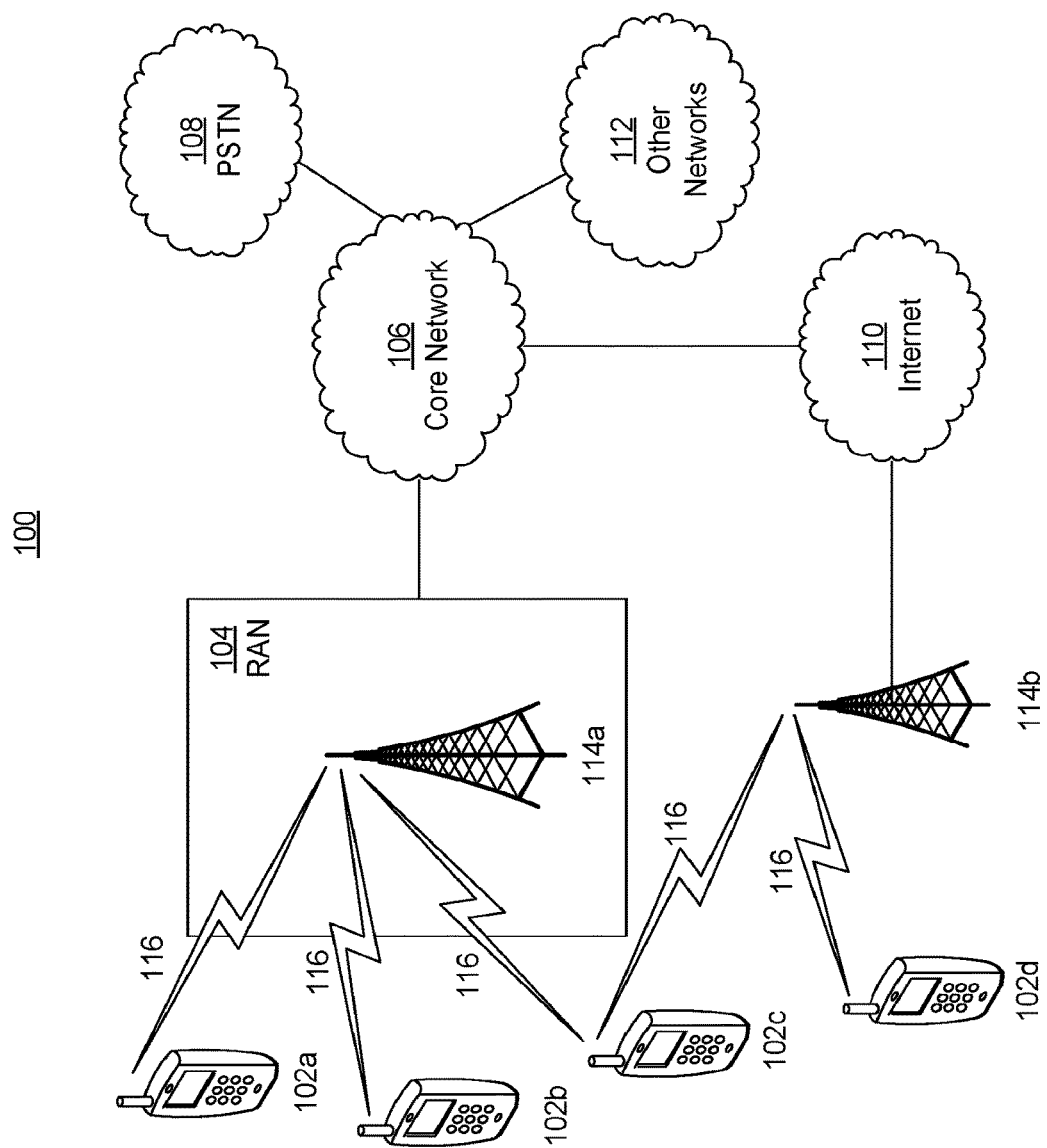
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g. a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g. WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g. the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
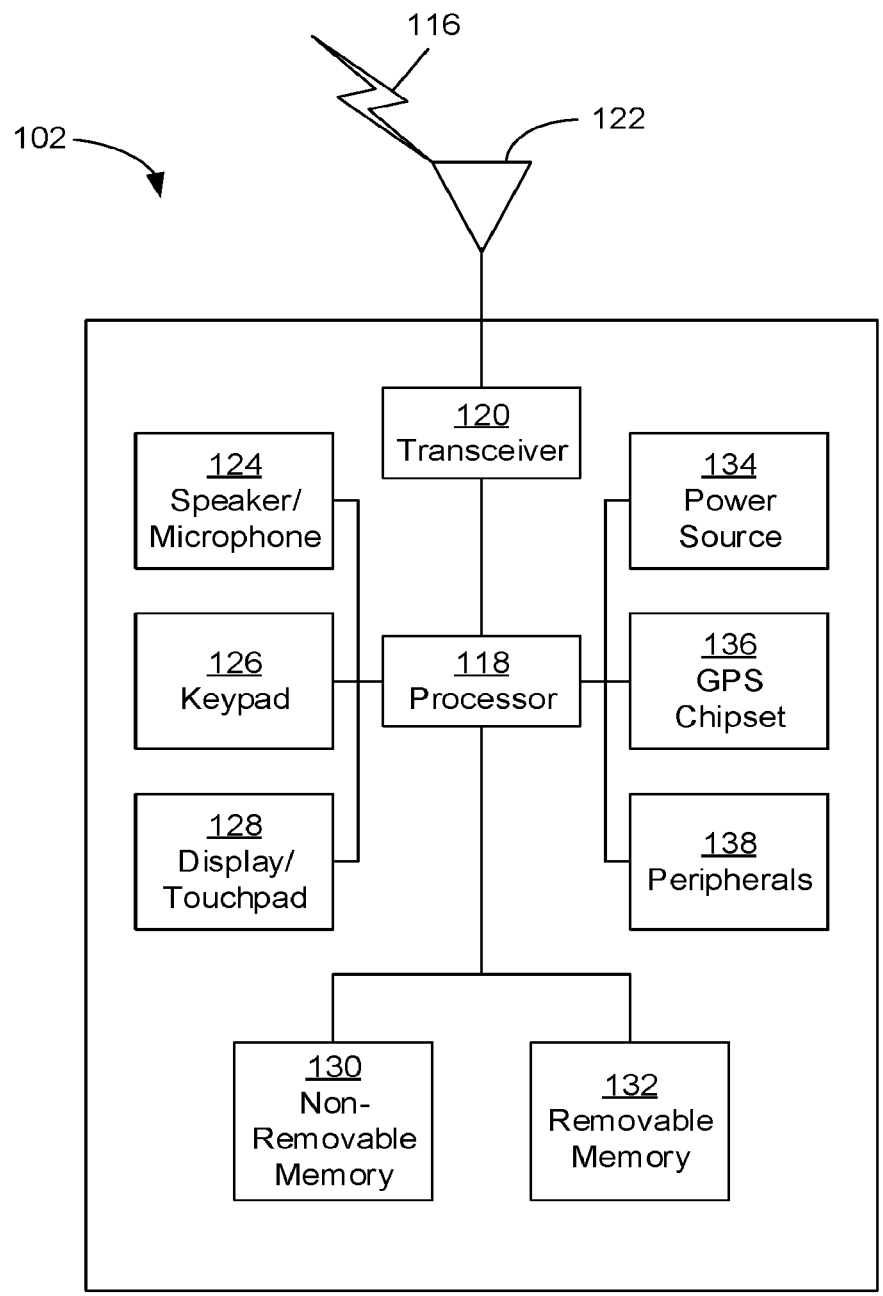
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g. associated with particular subframes for both the uplink (UL) (e.g. for transmission) and downlink (DL) (e.g. for reception) may be concurrent and/or simultaneous. The full duplex radio may include an interference management unit 139 to reduce and or substantially eliminate self-interference via either hardware (e.g. a choke) or signal processing via a processor (e.g. a separate processor (not shown) or via processor 118). In an embodiment, the WTRU 102 may include a half-duplex radio for which transmission and reception of some or all of the signals (e.g. associated with particular subframes for either the UL (e.g. for transmission) or the downlink (e.g. for reception)).

Figure 1C:
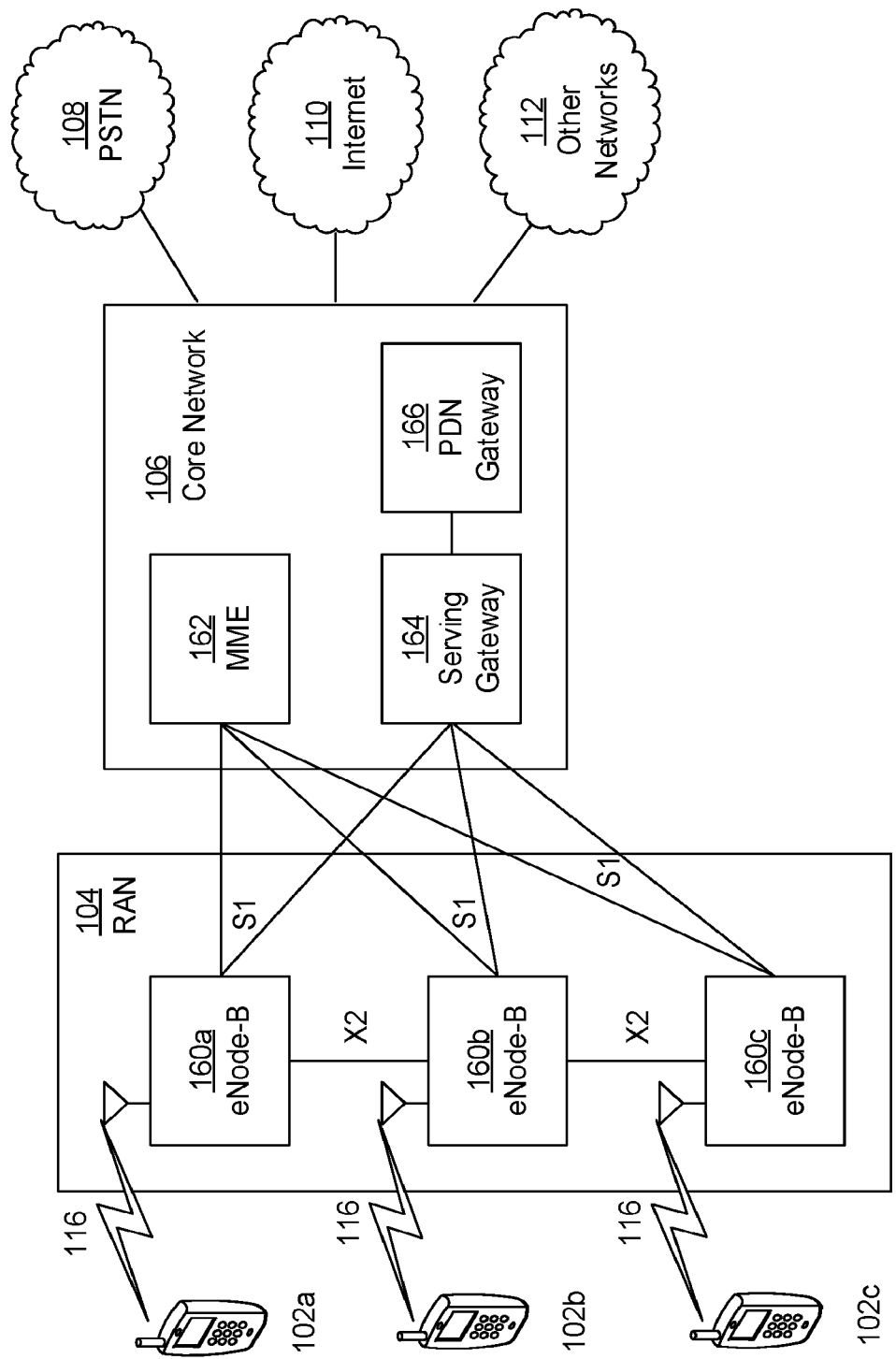
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g. temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHZ, 4 MHz, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
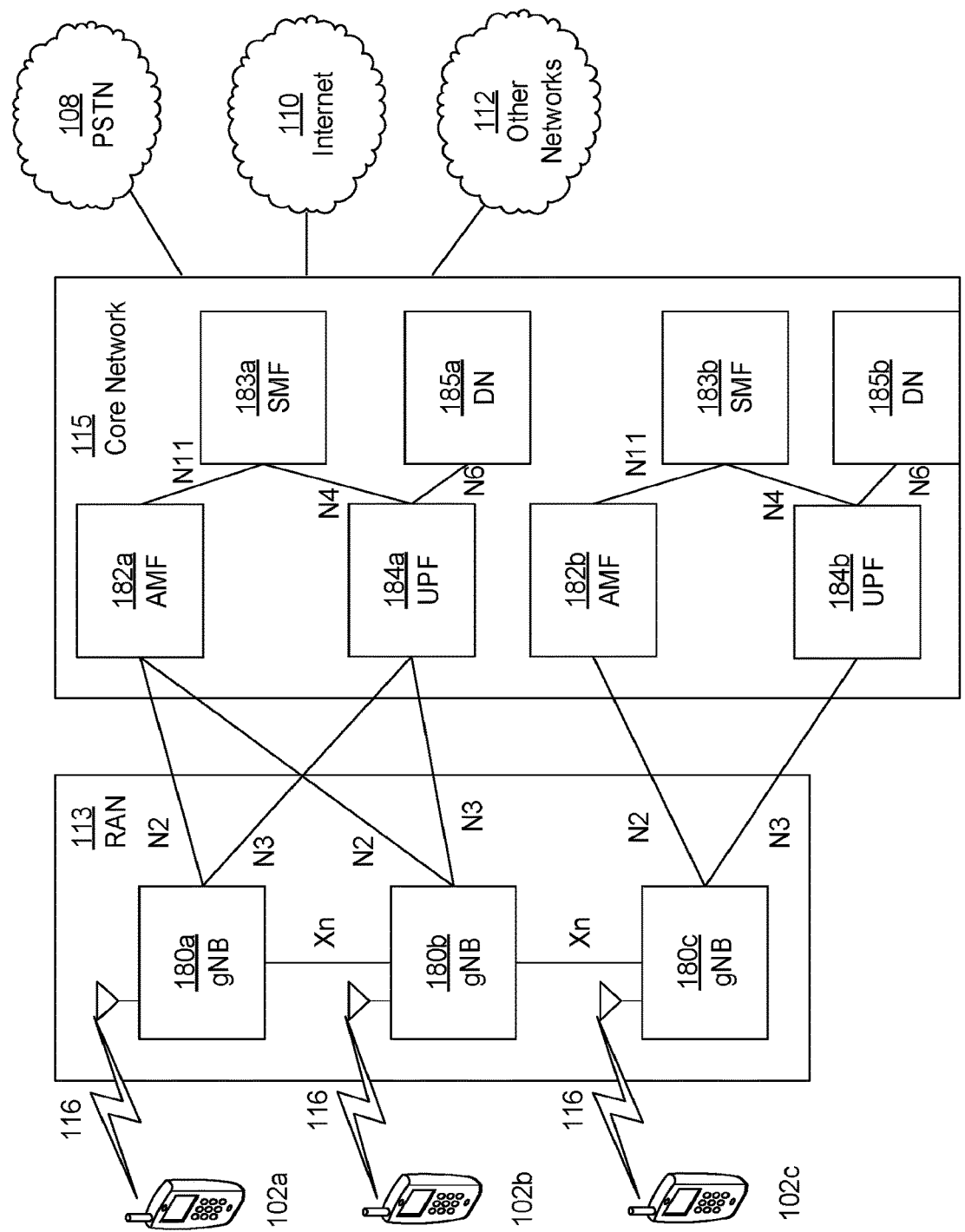
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Examples provided herein do not limit applicability of the subject matter to other wireless technologies, e.g., using the same or different principles as may be applicable.

"Network" may refer to one or more gNBs that may (e.g. in turn) be associated with one or more Transmission/Reception Points (TRPs) or other node in a radio access network (RAN).

Mobile communications are in continuous evolution. The fifth generation of evolution is referred to as 5G.

A 5G system may correspond, e.g., at least in part, to a new radio (NR) access technology.

A 5G air interface may support or enable, for example, improved broadband performance (IBB), industrial control and communication (ICC), vehicular to everything communication (V2X), massive machine-type communications (mMTC), ultra-low latency (LLC) transmission, ultra-reliable transmission (URC) and/or MTC operation, which may include narrowband operation.

In an example of support for LLC, an air interface latency may be, for example, 1 ms round trip time (RTT). A TTI may be, for example, between 100 us and 250 us.

A WTRU may be configured to support ultra-low access latency (e.g., time from initial system access until the completion of the transmission of the first user plane data unit). For example, a communication (e.g., IC and/or vehicular to everything communication (V2X)) may have end-to-end (e2e) latency, for example, less than 10 ms.

In an example of support for URC, transmission reliability may be, for example, approximately 99.999% transmission success and service availability.

Support may be provided for mobility. Mobility speed may range, for example, from 0- to 500 km/h.

Support may be provided for a packet Loss Ratio (PLR) less than $10e^{-6}$ for communications (e.g., IC and V2X).

In an example of support for MTC operation, an air interface may support narrowband operation (e.g., using less than 200 KHz), extended battery life (e.g., up to 15 years of autonomy) and/or minimal communication overhead for small and infrequent data transmissions (e.g. low data rate in the range of 1-100 kbps with access latency of seconds to hours).

Orthogonal Frequency-Division Multiplexing (OFDM) may be used as a signal format for data transmissions, e.g., for LTE and/or IEEE 802.11. OFDM may be used to divide spectrum into multiple parallel orthogonal subbands. A (e.g., each) subcarrier may be shaped using a rectangular window in the time domain, which may lead to sinc-shaped subcarriers in the frequency domain. OFDM Access (OFDMA) may be implemented with (e.g., perfect) frequency synchronization and (e.g., tight) management of uplink timing alignment within the duration of a cyclic prefix, for example, to maintain orthogonality between signals and to minimize intercarrier interference. Tight synchronization may be a challenge, for example, in a system where a WTRU may be simultaneously connected to multiple access points. Additional power reduction may be applied to uplink transmissions, e.g., to comply with spectral emission requirements in adjacent bands, which may occur in the presence of aggregation of fragmented spectrum for a WTRU's transmissions.

OFDM (e.g., cyclic prefix (CP)-OFDM) may be implemented, for example, with more stringent RF requirements, such as when operating with a large contiguous spectrum without requiring aggregation. A CP-based OFDM transmission scheme may lead to a downlink physical layer for 5G similar to preceding generations, such as modifications to pilot signal density and location.

5gFLEX may use a waveform other than OFDM for 5G systems.

5gFLEX radio access may be characterized, for example, by a very high degree of spectrum flexibility that may enable deployment in different frequency bands with different characteristics, such as different duplex arrangements, different and/or variable sizes of available spectrum (e.g. contiguous and/or non-contiguous spectrum allocations in the same or different bands). 5gFLEX radio access may support variable timing aspects, such as multiple TTI lengths and/or asynchronous transmissions.

Time Division Duplex (TDD) and Frequency Division Duplex (FDD) schemes may be supported, e.g., in a duplexing arrangement. Supplemental DL operation (e.g. for FDD operation) may be supported, for example, using spectrum aggregation. FDD operation may support full-duplex FDD and half-duplex FDD operation. DL/UL allocation (e.g., for TDD operation) may be dynamic (e.g. may or may not be based on a fixed DL/UL frame configuration). The length of a DL transmission or a UL transmission interval may be set, for example, per transmission opportunity.

Carrier aggregation (CA) may be used in wireless communications networks, such as in LTE-A, and may be used for both FDD and TDD. Each of the aggregated carriers may be referred to as a component carrier (CC) and the aggregated CCs may have the same bandwidth or different bandwidths. The aggregation of multiple CCs may increase the wireless bandwidth available to a WTRU. For example, if each CC has a bandwidth of 20 MHz and the wireless network is configured to aggregate up to five CCs, the wireless network may achieve a maximum aggregated bandwidth of 100 MHz when transmitting data to, or receiving data from, the WTRU.

In wireless networks employing CA, there may be one UL CC and one corresponding DL CC per serving cell. For example, the aggregation of five UL CCs may involve five serving cells, with each aggregated UL CC associated with the corresponding DL CC of the respective serving cell. Thus, in CA the number of aggregated UL CCs may not exceed the number of corresponding DL CCs. One of the serving cells may be referred to as the primary serving cell, which may manage the primary UL CC. The other UL CCs aggregated with the primary UL CC may be referred to as secondary UL CCs. The secondary UL CCs may be managed by their respective secondary serving cells. Thus, the primary UL CC and the secondary UL CCs may each utilize a reference signal and/or a control channel from a respective DL CC. The primary UL CC and the secondary UL CCs may each have different physical cell IDs (PCIs). The secondary UL CCs may be added and removed as needed while the primary UL CC may be changed in certain instances, such as during handover.

Figure 2:
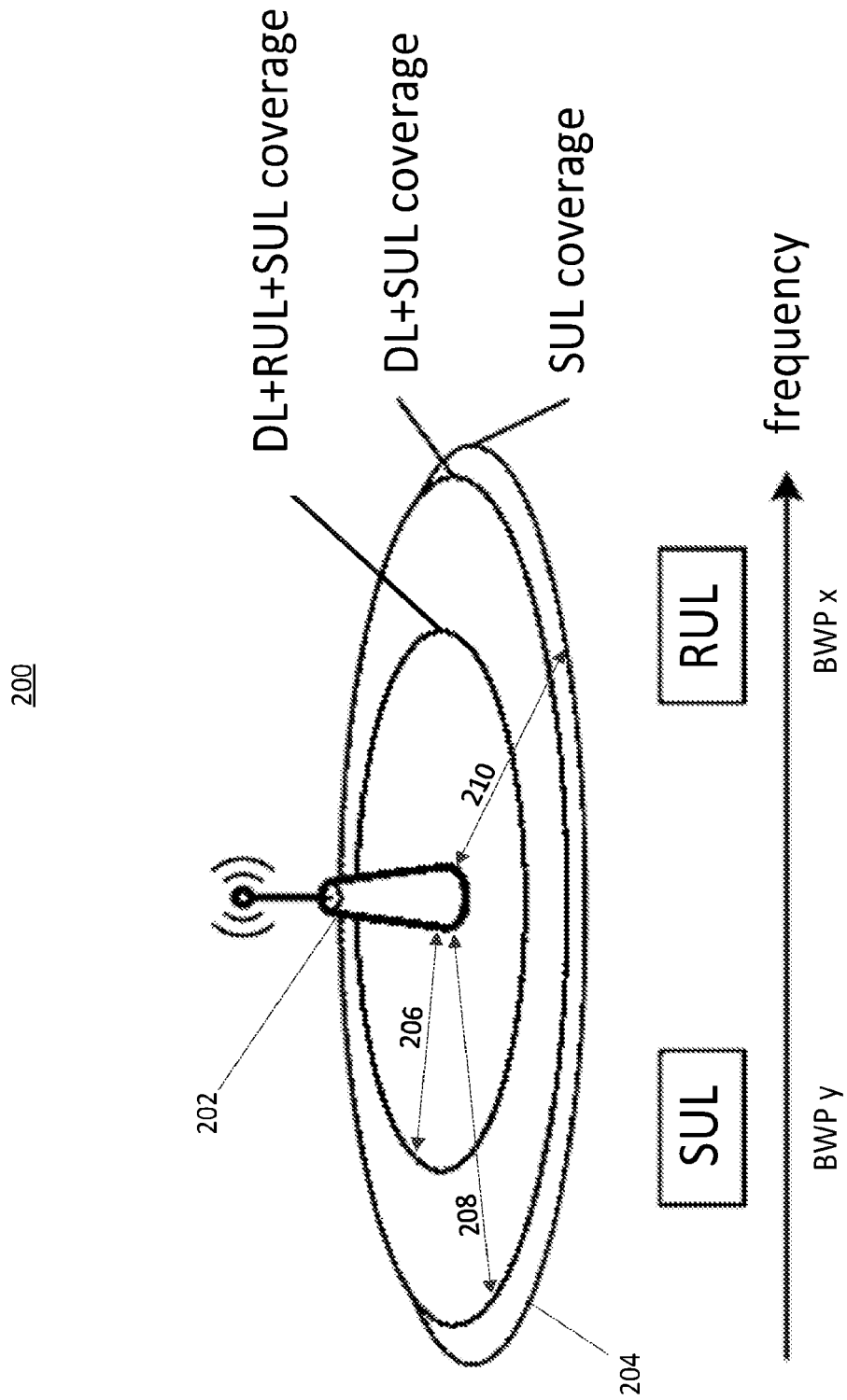
FIG. 2 is a system diagram illustrating an example wireless cell with coverage areas for a downlink (DL) carrier and two more corresponding uplink (UL) carriers.

FIG. 2 illustrates an example cell 200 (e.g., in NR) including a base station 202 (e.g., a gNB) in which a WTRU (not shown) may be configured with a DL carrier and one or more UL carriers. The cell 200 may have an overall wireless coverage area 204, which may include areas 206, 208, 210. The area 206 may extend radially outward from the base station 202 and may represent a portion of the coverage area 204. The area 208 may extend radially outward from the base station 202, beyond the area 206, and may also represent a portion of the coverage area 204. The area 210 may extend radially outward from the base station 202, beyond the areas 206, 208, and may be the same (or substantially the same) as the coverage area 204. Accordingly, the area 210 may encompass the areas 206, 208, and the area 208 may encompass the area 206.

The WTRU operating within the cell 200 may be configured with a UL carrier that is associated with a DL carrier of the cell 200. This carrier may be referred to as a regular UL (RUL) carrier and may include a bandwidth part (BWP) x. The WTRU may be further configured with one or more additional uplink carriers, which may be referred to as supplementary UL (SULs) carriers. The SUL carrier may include a BWP y. The RUL and SUL carriers may each be associated with the DL carrier of the cell 200. As such, both the RUL and SUL carriers may be associated with or inherently linked to the same DL carrier (e.g., more than one UL carrier per DL carrier). For example, a reference signal on the DL carrier may be used for channel estimation on the RUL and SUL carriers. One or more control channels on the DL carrier may be used to control the RUL and SUL carriers. The RUL and SUL carriers may utilize the same PCI.

The respective frequencies (or frequency bands) of the DL, RUL and/or SUL carriers may be the same or different. For example, the frequency (or frequency band) of the SUL carrier may be higher or lower than the frequency (or frequency band) of the DL carrier and/or the RUL carrier. The RUL and SUL carriers may include respective configurations for power control settings. For example, the RUL and SUL carriers may each have a separate (e.g., different) max power setting (e.g., PCMAX) and/or other related power parameters. The SUL carrier may be considered by the cell 200 for enhanced coverage, e.g., in scenarios where the RUL carrier is beamformed and the channel conditions (e.g., the RSRP) are unfavorable. The SUL carrier may be used to offload capacity from the RUL carrier in certain scenarios, as determined by the cell 200, for example. The cell 200 may choose to semi-statically configure the Physical Uplink Control Channel (PUCCH) on the SUL for better reliability, while using the RUL carrier for capacity enhancement for data transmissions. Resource allocation procedures may be initiated on the SUL carrier if channel conditions (e.g., the measured RSRP) are below a configured threshold.

As shown in FIG. 2, the DL, RUL and SUL carriers may cover the area 206. At a given transmission power level, lower frequency transmissions may propagate over longer distances than higher frequency transmissions. Thus, if the frequency of the SUL carrier is lower than the RUL carrier, the DL and SUL carriers may cover the area 208, which may extend beyond the area 206. If the frequency of the SUL carrier is lower than the DL carrier, the SUL carrier may cover the area 210, which may extend beyond the areas 206, 208, thereby capturing (or substantially capturing) the overall coverage area 204. As such, the SUL carrier may be utilized, for example, when the WTRU moves towards the edge of coverage of the RUL carrier of the cell 200. It will be appreciated that the SUL carrier may be used to support one or more services (like URLLC, eMBB, MTC, etc.), which may require higher throughput, improved transmission reliability, and/or low latency.

The WTRU may perform transmissions on the SUL carrier, for example, when the WTRU is configured to operate at a lower frequency (or frequency band). The WTRU may include a transmitter configured to change transmission frequencies when switching between the RUL and SUL carriers. The WTRU may, therefore, be configured to perform transmissions on the RUL and SUL carriers sequentially or near concurrently (e.g., in a TDMA fashion). In an example, the WTRU may include more than one transmitter (e.g., one configured to transmit on the RUL carrier frequency and one configured to transmit on the SUL carrier frequency at a given time or time interval). As such, the WTRU may be configured to perform transmissions on the RUL and SUL carriers concurrently.

The SUL carrier may be configured for any type of cell. The cell 200 may be, for example, a standalone wireless system or part of a multi-RAT dual connectivity wireless system. The cell 200 may be a primary cell (PCell), a secondary cell (SCell) and/or a secondary PCell (SPCell), which may be used for dual connectivity.

The WTRU, operating in the cell 200 for example, may perform initial access using the RUL carrier and/or the SUL carrier. In an example, the WTRU may select the SUL carrier for initial access, for example, when an attribute of the DL carrier of the serving cell may be below a threshold, such as a configured threshold. The attribute of the DL carrier may be associated with any suitable threshold, such as a minimum reference signal received power (RSRP). The base station 202 of the cell 200 may broadcast an SUL configuration via any suitable signaling, such as in (e.g., minimum) system information (SI) for the cell 200.

The WTRU may be configured to use the SUL carrier in different operating modes, such as a Radio Resource Control (RRC) Connected mode. In an example of a first mode, an RRC entity may configure the WTRU with multiple UL carriers, which may include the RUL carrier via a (e.g. a typical) UL configuration in the cell 200. The multiple UL carriers may further include the SUL carrier with a sounding reference signal (SRS) configuration. In the example first mode, the WTRU may transmit (e.g., all) control and user data via the resources of the RUL carrier and may transmit SRS information using the resources of the SUL carrier. The RRC configuration (or reconfiguration) may, for example, provide an extended, typical and/or complete UL configuration for the WTRU to activate one of the UL carriers and/or to switch an applicable active UL carrier associated with the cell 200 (e.g., for some or all transmissions).

In an example of a second mode, the RRC entity may configure the WTRU with multiple UL carriers with an extended, typical and/or complete UL configuration. The configuration may be sufficient for the WTRU to perform one or more UL transmissions (e.g., the PUCCH, the Physical Uplink Shared Channel (PUSCH) and/or the Physical Random Access Channel (PRACH)) using the resources of the configured UL carriers (e.g., the RUL and/or SUL carriers). The WTRU may (e.g., subsequently) receive control signaling (e.g., via a MAC control element (CE) or via downlink control information (DCI)) that may activate and/or initiate a switch between UL carriers, such as switching between RUL and SUL carriers.

In an example of a third mode, the RRC entity may configure the WTRU with multiple UL carriers, which may be active concurrently and/or in a TDMA fashion. This mode of operation may restrict the WTRU from (e.g., simultaneously) performing one or more types of UL transmissions. For example, the WTRU may not transmit PUSCH for the cell 200 simultaneously on the RUL and SUL carriers. The restriction may be configured in the event, for example, the WTRU does not support simultaneous transmission (e.g., for the configured frequency bands), such as when the WTRU is equipped with a single transmitter.

The WTRU may be configured with one or more BWPs of the cell 200 and/or associated UL carriers. Each BWP may be characterized (e.g., via configuration aspects) by a subcarrier spacing, a cyclic prefix, and/or a number of contiguous physical resource blocks (PRBs). Each BWP may include a frequency location, such as a center frequency.

The WTRU may be configured with an (e.g., initial) BWP. For example, the WTRU may be configured with the (e.g., initial) BWP from the reception of SI, which may enable the WTRU to access the system using the initial BWP of the cell 200 and/or associated UL carriers. The WTRU may be configured for initial access, such as when the WTRU is in IDLE mode and/or when the WTRU determines that it should establish a RRC connection to the system. The configuration of the initial BWP may include a configuration for random access.

The WTRU may be configured with a default BWP, such as when the WTRU is in a connected mode. The default BWP may be the same as, similar to, or different from the initial BWP. The WTRU may determine to revert to the default BWP based on certain conditions, such as after the expiration of a timer. In one example, the timer may correspond to a period of scheduling activity or inactivity.

The WTRU may be configured with additional BWPs. For example, the WTRU may be configured with one or more BWPs for a specific type of data transfer, such as those supporting URLLC services.

Although the examples described herein may be described with respect to selecting data and/or logical channels to be transmitted on different uplink carriers (e.g., RUL, SUL, etc.) the examples and criteria for selection may also be equally applicable for selecting a BWP to use for a given transmission. For example, logical channels may be restricted to transmission on certain BWPs and/or other criteria used here for selecting an appropriate UL carrier for transmission may be similarly used for selecting an appropriate BWP for transmission.

As noted above, the cell 200 may operate with a DL carrier frequency, and (e.g., optionally) with an UL carrier frequency, such as the RUL carrier. The cell 200 may further operate with additional UL carriers, such as the SUL carrier. In the case of NR, the WTRU may be configured to operate with zero, one, two or more uplink carriers (e.g., RUL and SUL carriers) associated with the DL carrier. The two or more UL carriers may be in different frequency bands, which may impact the WTRU's procedure(s). The procedure(s) may, for example, be based on the path loss acquisition of the DL transmission in the same carrier.

The selection of an UL carrier for layer-2 (L2) procedures may depend on one or more attributes (e.g., factors, parameters, criteria, conditions, triggers, qualities, characteristics, etc.) related to the wireless system, such as the DL and UL carriers, the wireless services being provided and/or the data/information being transmitted. One or more of the attributes may be used to determine which of the configured UL carriers may be utilized for a given transmission by the WTRU. The attributes may also be used to determine transitions between UL carriers (e.g., between the RUL and SUL carriers) and/or any impact to an ongoing procedure.

As noted above, the WTRU may be configured with one or more SUL carriers for a given cell, such as the cell 200 shown in FIG. 2. It will be appreciated that where an individual SUL carrier is described herein, the same considerations may apply for a WTRU configured with multiple SUL carriers, either individually or in combination. For example, the WTRU may select a first subset of applicable/available UL carriers (e.g., based on DL measurements that meet or exceed a specific threshold) and determine the applicable UL carriers (e.g., based on the reception of DCI or DCI scheduling). The UL carrier may be represented as a configured UL BWP. For example, the WTRU may determine the applicable SUL carrier based on a BWP determination (e.g., UL only) alone or in combination with other techniques described herein.

The WTRU may employ packet duplication by transmitting data/information using multiple UL carriers, sequentially or concurrently. Duplicate data may be transmitted on more than one UL carrier via the RUL carrier and/or via one or more of the SUL carriers. Packet duplication may be useful in situations in which propagation conditions for a subset of carriers deteriorate. Packet duplication may also be useful to improve transmission reliability and/or latency.

The determination of applicable UL carrier(s) (e.g., the selection and/or activation of the RUL and SUL carriers) may be static, semi-static and/or dynamic. Static determinations of applicable UL carrier(s) may be by configuration, such as from the reception of SI and/or from a pre-configuration. Semi-static determinations of applicable UL carrier (s) may be by layer 3 (L3) signaling and/or RRC control. Dynamic determinations of applicable UL carrier(s) may be by layer 1 (L1) or layer 2 (L2) signaling, and/or by L1/MAC signaling.

A WTRU configured with RUL and SUL carriers may (e.g., also) be configured with SRS for the SUL carrier. As such, the WTRU may be configured with a threshold, for example, for determining which UL carrier to select and/or activate.

The wireless network (e.g., via the cell 200) may control the selection and/or activation of the RUL and SUL carriers. In an example of a semi-static configuration, the WTRU may initially be configured (e.g., via the RRC entity) with the RUL carrier and a threshold (e.g., with or without the SRS for the SUL carrier). The WTRU may subsequently be configured (e.g., via the RRC entity) with the SUL carrier upon an event.

In an example of dynamic configuration/signaling, the WTRU may receive an indication (e.g., via DCI, a DCI indication, and/or a MAC CE) to use the RUL and/or SUL carriers. For example, a reconfiguration of a cell, such as the cell 200, with the SUL carrier may be conveyed via the DCI, e.g., for cross-carrier scheduling using a carrier ID for the SUL carrier or for BWP control of an associated SUL carrier.

In an example of combining semi-static and dynamic configuration/signaling, a DCI with a specific HARQ process ID may be used, for example, to convey to the WTRU whether to use the RUL carrier and/or the SUL carrier. The WTRU may be (e.g., first) configured with different sets of HARQ processes for the RUL and SUL carriers. The HARQ processes may each include a process ID. The WTRU may determine which UL carrier to use, for example, based on the respective process ID, which may be indicated in the DCI (e.g., configured or dynamically allocated).

The WTRU may initiate the RUL and/or SUL carrier selection and/or activation. In an example, the WTRU may determine that a respective threshold has been reached (or not reached), upon which the WTRU may initiate a procedure to select the RUL and/or SUL carriers and/or to perform a switch between the RUL and SUL carriers. The network (e.g., the cell 200) may determine that a change of applicable UL carrier has occurred. For example, the network may determine that the change has occurred as a result of the WTRU initiating transmission of an SRS on the RUL and/or SUL carrier, from a random access procedure initiated by the WTRU, and/or from the WTRU's transmission of UL control information. The WTRU may determine to select, or switch between, the RUL and/or SUL carriers (and report such selection/switch to the network) based on, for example, one or more of the following: (i) one or more measurement report triggering events (e.g., MAC CE, status report (SR) transmission, measurement, RRC signaling, start using SRS on the SUL carrier, RACH on the SUL carrier, etc.); (ii) a measurement or DL pathloss estimation with an indication by a transmission (e.g., in a resource of the RUL carrier or the SUL carrier) of SRS, e.g., when the WTRU may be time-aligned in the UL carrier; and/or (iii) a measurement or DL pathloss estimation with an indication by a transmission (e.g., in a resource of the RUL carrier or the SUL carrier) with RACH, e.g., using a specific preamble and/or PRACH resource. The network (e.g., the cell 200) may instruct a switch, such as via a MAC CE, DCI, RRC, etc., or may provide an UL-SCH resource on the UL carrier.

It will be appreciated that the selection, switching, activation and/or initiation of the RUL and/or SUL carriers may be, for example, any combination of static, semi-static, dynamic, pre-configured, network-controlled, WTRU-initiated, etc.

The activation, selection and/or switching of the RUL and/or SUL carriers may have a wide variety of (e.g., dynamic) causes or triggers that may be determined, for example, based on one or more attributes of the wireless system. For example, the activation, selection and/or switching may be based on one or more of the following attributes: (i) timing aspect (e.g., some slots may be assigned a UL carrier); (ii) transmission type (e.g., URLLC, eMBB, mMTC, etc.), signal, and/or UL channel for a transmission; (iii) sub carrier spacing (SCS) used for transmission; (iv) logical channel (LCH) configuration; (v) service type (e.g., URLLC, eMBB, mMTC); (vi) payload, amount of data available for transmission, and/or data size; (vii) indication in a UL grant or DL assignment (e.g., indicate carrier used for HARQ feedback); (viii) redundancy version (RV) of a transmission (e.g., a retransmission may use a different UL carrier than a previous (re)transmission); (ix) WTRU mobility or speed; and/or (x) QoS (e.g., latency) requirements of the data to be transmitted.

The timing attribute may include system-related timing, such as system frame numbering (SFN), framing-related timing, and/or other timing such as timing controlled using timers. For example, for framing-related timing, symbols, mini-slots, slots, and/or subframes may be assigned or associated with one or more relevant UL carrier(s).

For a transmission type (e.g., UL control information, RRC control plane signaling, user plane data), signal and/or UL channel to be transmitted (e.g., PUCCH, PUSCH, SRS, etc.), the WTRU may perform transmission of UL control information (e.g., HARQ feedback, channel quality indication (CQI), etc.) using a first carrier (e.g., the RUL carrier), while the WTRU may perform transmission of data on the resources of a second carrier (e.g., a SUL carrier).

For a SCS transmission, the WTRU may perform a first transmission using the resources of a first UL carrier configured with a first SCS, and it may perform a second transmission using the resources of a second UL carrier configured with a second SCS as a function of a configuration aspect, such as an association between a type of bearer (e.g., a signaling radio bearer (SRB) or dedicated radio bearer (DRB) and an applicable SCS).

As will be further discussed below in connection with FIGS. 3-5, for a LCH configuration, the WTRU may be configured with an association between one or more applicable UL carrier(s) and a LCH (or a group thereof, such as a LCH group (LCG) for the transmission of data from the respective LCHs). The WTRU may determine the applicable UL carrier when the WTRU determines that the WTRU has (e.g., new) data available for transmission as a function of the LCH associated with the data. In another example, the QoS or priority configuration of the LCH may be used by the WTRU to determine which UL carrier(s) are to be utilized.

Service types may be linked to network configured access categories, configured either in the non-access stratum (NAS) or access stratum (AS). Service types may be advertised in SI and/or provided by WTRU-specific signaling. Service types may be linked to transmission parameters in lower layers, such as the numerology and/or transmission duration.

For payload, amount of data available for transmission, and/or data size, the WTRU may be configured to determine the applicable UL carrier, for example, as a function of the size of the data to be transmitted. The size of the data to be transmitted may correspond to a transport block (TB), a MAC PDU, an RLC PDU, or a packet data convergence protocol (PDCP) PDU for a given transmission and/or a total amount of data available for transmissions, for one or more LCH(s). For example, the WTRU may determine to use the resources of a first UL carrier (e.g., the SUL carrier) if it determines that the amount of data is less than a (possibly configured) threshold value or those of a second UL carrier if the amount of data is greater than the threshold value. The WTRU may make the UL carrier selection based on the threshold attribute alone or in combination with another attribute, such as the grant size or the pathloss estimate. For example, if the WTRU is configured with the SUL carrier, the WTRU may determine to use resources of another UL carrier (e.g., the RUL carrier) if the WTRU determines that the amount of data is more than a (possibly configured) threshold value, and/or if the estimated pathloss is less than a threshold and/or less than the WTRU's total available power less a value associated with the concerned data size. Otherwise, the WTRU may use the resources of the SUL carrier.

For an indication in a UL or DL assignment, the WTRU may receive DL control signaling that indicates the applicable UL carrier for the transmission of HARQ feedback for a DL transmission. For example, the WTRU may receive DL control signaling that may indicate the applicable UL carrier for the transmission of a TB in the UL transmission. The indication may be a configuration aspect, for example, as indicated in a higher layer (e.g., an RRC layer) configuration received by the WTRU (e.g., via a configured grant and/or via semi-persistent scheduling).

For RV of a transmission, a HARQ retransmission may use a different UL carrier than a previous (re)transmission as a function of the applicable RV. As such, the WTRU may determine the applicable UL carrier, for example, from the sequence of the (re-)transmissions for a HARQ process.

For WTRU mobility or speed, the WTRU may determine the applicable UL carrier(s) as a function of its estimated speed, the frequency or number of handovers over a period of time, and/or the frequency of paging or tracking area updates.

The WTRU may condition UL carrier selection on carrier availability and/or meeting certain quality thresholds (e.g., RSRP) alone or in combination with any of the above criteria.

The WTRU may (e.g., autonomously) switch from the RUL carrier to the SUL carrier, for example, when a triggering condition is met.

The WTRU may receive grants for the RUL carrier and/or the SUL carrier, for example, for the same time resource and/or for overlapping time resources. UL grants for the RUL and SUL carriers may be received in the same DCI or in different DCIs. The WTRU may be configured (e.g., with a function) to translate a grant received for the RUL carrier into a corresponding grant in the SUL carrier and/or vice versa. This may enable (e.g., fast) WTRU autonomous switching between the RUL and SUL carriers when a triggering condition is met.

The WTRU may determine a UL carrier on which to transmit on PUSCH. The WTRU may select the UL carrier for a transmission on PUSCH according to a prioritization (e.g., a prioritization procedure) that may be based on one or more of the following attributes of the wireless system: (i) an estimated pathloss to RUL carrier and/or the SUL carrier (e.g., a switch to SUL carrier may be triggered when a pathloss to the RUL carrier may be below a configured threshold); (ii) power headroom (PH) of the RUL carrier and/or the SUL carrier (e.g., the SUL carrier may be used when a PH of the RUL carrier may be below a threshold such as 0 dB); (iii) a payload, amount of data available for transmission, and/or data size; (iv) a size of one or more SUL grants relative to a size of one or more RUL grants (e.g., when a MAC PDU produced by a MAC multiplexing and assembly entity may fit in either grant without segmentation); (v) LCHs with buffered data and associated priorities (e.g., including any channel selection restrictions that may be imposed via a LCH prioritization (LCP) procedure); (vi) occurrence of one or more triggering events for the UL carrier selection in a RACH procedure; and/or (vii) dynamic RUL/SUL carrier selection criteria or conditions (e.g., indication through L1/L2 signaling). For example, the WTRU may select the UL carrier for transmission when simultaneous transmission on more than one UL carrier (e.g., both the RUL and SUL carriers) is not available, possible, or practical.

The WTRU may indicate to the network (e.g., the cell 200) a selected UL, which the WTRU may use to transmit on the PUSCH. The WTRU may report information to the network by, for example, transmitting an example type of uplink control information (UCI) (e.g., over the RUL and/or SUL carriers) and/or multiplexing a UCI onto the PUSCH for a selected UL carrier, or on a (e.g., specific) PUCCH resource on the RUL and/or SUL carriers.

The WTRU may (e.g., additionally or alternatively) transmit on the RUL and/or SUL carriers pursuant to a grant that may indicate resources for a transmission on the RUL and/or SUL carriers. The RUL and SUL transmissions may or may not be simultaneous in time. For example, the WTRU may transmit (e.g., first) on the UL carrier with a larger SCS and may (e.g., subsequently) transmit a duplicate (e.g., with same or different RV) on the UL carrier with a smaller SCS. This may, for example, enable the network (e.g., the cell 200) to attempt to decode the WTRU's transmission after (e.g., only) a first transmission (e.g., with lower latency).

Applicability restrictions may be utilized. In an example, a DCI indication in a grant's HARQ information may provide (e.g. implicitly or explicitly) information (e.g., to a MAC entity) about which UL carrier to use, such as the RUL and/or SUL carrier. A LCP procedure may be used to restrict LCHs (e.g., via a MAC entity) to use (or not use) a certain or specified UL carrier. Such restrictions may be used, for example, for enhanced reliability and/or latency for one or more of the LCHs.

The LCP procedure may use one or more attributes (e.g., factors, parameters, criteria, conditions, triggers, qualities, characteristics, etc.) related to the wireless system to assign LCHs to respective UL carriers. The attributes may relate to one or more of the following: (i) system-related timing; (ii) type of UL transmission (e.g., UCI, control plane signaling, user plane data); (iii) the SCS used for UL transmission; (iv) QoS requirements, (v) service being supported by UL transmission (e.g., URLLC, eMBB, mMTC, etc.), (vi) payload, data size and/or amount of data to be transmitted, (vii) indications in UL and/or DL assignments, (viii) the RV of a transmission, (ix) the mobility of the WTRU, such as the speed of the WTRU, the frequency of WTRU handovers and/or the frequency of paging/tracking area updates, (x) wireless coverage of the RUL and SUL carriers (e.g., RSRP measurements that are above or below a threshold) and/or (xi) the priority of the data to be transmitted.

The RRC entity may use the LCP procedure to assign one or more of the WTRU's LCHs to respective UL carriers. For example, the RRC entity may assign UL carriers according to one or more of the following: (i) the RUL carrier only for UL-SCH resources; (ii) the SUL carrier only for UL-SCH resources; and/or (iii) both the RUL and SUL carriers (e.g., without restrictions). Based on the attributes, the RRC entity may indicate that duplication should be performed across the RUL and SUL carriers. The duplicate data may be transmitted on the RUL and SUL carriers, sequentially or concurrently.

The WTRU may include a receiver that is configured to receive one or more UL grants. The UL grant(s) may include an allocation associated with the RUL carrier and an allocation associated with the SUL carrier. The RUL and SUL carriers may be associated with a common DL carrier of a serving cell. The WTRU may include a processor that is configured to select data from one or more logical channels for transmission in accordance with the allocations in the one or more UL grants. For example, one logical channel may be selected based on at least an allocation being associated with the RUL carrier and another logical channel may be selected based on at least another allocation being associated with the SUL carrier. The WTRU may include a transmitter that is configured to transmit data from the one logical channel on the RUL carrier and to transmit data from the other logical channel on the SUL carrier in accordance with the respective allocations.

Figure 3:
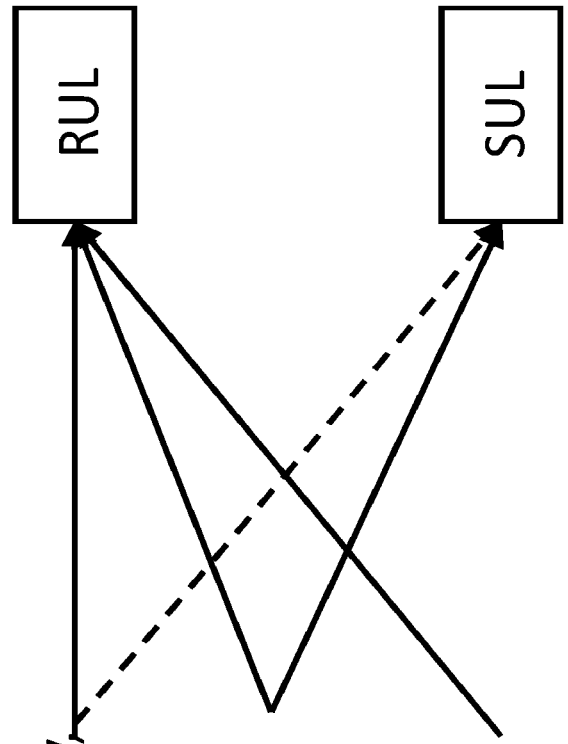
FIG. 3 illustrates an example logical channel prioritization (LCP) procedure for prioritizing data from one or more logical channels (LCHs) and/or for assigning such LCHs to one or more UL carriers associated with a cell.

FIG. 3 illustrates an example LCP procedure 300. As shown in FIG. 3, data that is to be transmitted by the WTRU may be assigned respective priorities. For example, the data may be associated with one or more LCHs, such as LCH 1, LCH 2 and LCH 3. Data from LCH 2 may have a higher priority than data from LCH 1 and LCH 3. Data from LCH 1 may have a higher priority than data from LCH 3. Accordingly, the data from LCH 2 may be assigned the highest priority and the data from LCH 3 may be assigned the lowest priority.

In addition to prioritizing the data, the LCP procedure 300 may further include UL carrier assignments for the transmission of the data. For example, as further shown in FIG.

3, the data from LCH 1, LCH 2 and/or LCH 3 may be assigned to one or more UL carriers (e.g., the RUL and/or SUL carriers). The data from LCH 1 may be assigned to the RUL and SUL carriers based on wireless coverage. For example, the WTRU may transmit data from LCH 1 on the RUL carrier if an attribute of the RUL carrier is above a threshold. The attribute may include an RSRP measurement associated with the RUL carrier. The RSRP measurement may be above the threshold, for example, when the WTRU is within a certain distance (e.g., with the area 206) from a base station (e.g., the base station 202). The RSRP measurement may fall below the threshold as the WTRU approaches the edge of the RUL carrier's coverage, such as when the WTRU approaches the edge of the area 206 within the cell 200 shown in FIG. 2. If the attribute is below the threshold (e.g., because the WTRU has gone beyond the area 206 in the cell 200), the WTRU may be configured to transmit the data from LCH 1 on the SUL carrier.

The data from LCH 2 may correspond to a specific service that has certain transmission requirements, such as high reliability and/or low latency. For example, as shown in FIG. 3, the data from LCH 2 may correspond to a URLLC-type service. As such, the data from LCH 2 may be duplicated and transmitted via the RUL and SUL carriers. The data may be transmitted via the RUL and SUL carriers sequentially or concurrently.

The data from LCH 3 may also correspond to a specific service, such as eMBB. The data from LCH 3 may be assigned for transmission via the RUL carrier.

It will be appreciated that the foregoing prioritization procedures and channel assignments described in connection with FIG. 3 are merely exemplary. Other data prioritization procedures and/or LCH UL channel assignments may be implemented while remaining consistent with the disclosed embodiments.

Figure 4:
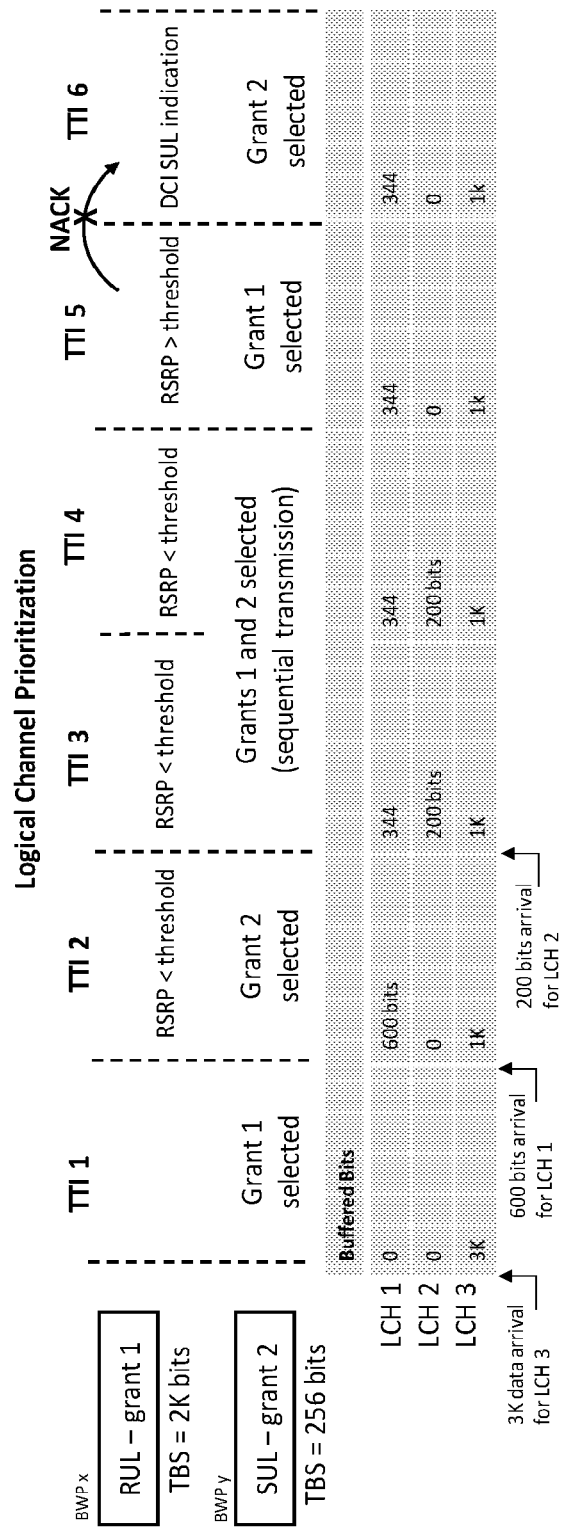
FIG. 4 illustrates an example series of transmit time intervals (TTIs) during which data from one or more LCHs may be transmitted sequentially over multiple UL carriers in accordance with the LCP procedure of FIG. 3.

FIG. 4 illustrates an example series 400 of TTIs during which data from one or more logical channels may be transmitted by the WTRU over UL carriers, such as the RUL and SUL carriers, based on the LCP procedure 300 described in connection with FIG. 3. As illustrated in FIG. 4, the WTRU may receive a grant 1 for the RUL carrier and a grant 2 for the SUL carrier. The WTRU may utilize the resources of the RUL and SUL carriers sequentially (e.g., in different TTIs) based on the capabilities of the WTRU. For example, the WTRU may not include multiple transmitters. As such, the WTRU may be incapable of transmitting on different frequencies simultaneously, such as transmitting on the RUL and SUL carriers during the same TTI. An example of simultaneous transmissions on the RUL and SUL carriers will be further described below in connection with FIG. 5.

As shown in FIG. 4, the series 400 may include TTI 1, TTI 2, TTI 3, TTI 4, TTI 5 and TTI 6 though it will be appreciated that the series 400 may include any number of TTIs. Data may be buffered from LCH 1, LCH 2 and LCH 3 for UL transmission, though it will be further appreciated that the data may be buffered from any number of LCHs. During TTI 1, TTI 2, TTI 3, TTI 4, TTI 5 and/or TTI 6, data may be transmitted via the RUL carrier (grant 1) and/or the SUL carrier (grant 2). The RUL and SUL carriers may have transport block sizes (TBSs) of 2 k bits and 256 bits, respectively, though the TBS values of the RUL and SUL carriers shown in FIG. 4 are merely exemplary.

At TTI 1, no data may be buffered from LCH 1 or LCH 2 while 3 k bits may be (e.g., newly) buffered from LCH 3. Pursuant to the LCP procedure 300, the 3 k bits buffered from LCH 3 (e.g., the data related to eMBB) may be transmitted via the RUL carrier. As such, the WTRU may select the RUL carrier (grant 1) to transmit 2 k bits of the buffered data (in accordance with the example TBS of the RUL carrier) from LCH 3 during TTI 1.

At TTI 2, no data may be buffered from LCH 2 while 600 bits may be (e.g., newly) buffered from LCH 1 and 1 k bits may remain buffered from LCH 3 (e.g., 3 k bits minus the 2 k bits transmitted during TTI 1). The 600 bits buffered from LCH 1 may support certain services, such as a service requiring URLLC. Pursuant to the LCP procedure 300, the 600 bits buffered from LCH 1 may have priority over the 1 k bits buffered from LCH 3. Moreover, the 600 bits from LCH 1 may be assigned to the RUL carrier provided an attribute (e.g., the RSRP) of the carrier is above a threshold. As shown in FIG. 4, the RSRP of the RUL carrier may be below the configured threshold. Accordingly, the WTRU may select the SUL carrier to transmit 256 bits of the buffered data (in accordance with the example TBS of the SUL carrier) from LCH 1 during TTI 2. It will be appreciated that the RUL carrier may not be available to transmit the 1 k bits from LCH 3 during TTI 2 in the present example because the WTRU may be incapable of transmitting on the RUL and SUL carriers simultaneously (e.g., during the same TTI) and/or because the 600 bits from LCH 1 have priority over the 1 k bits from LCH 3 pursuant to the example LCP procedure 300. As such, the 1 k bits from LCH 3 may remain buffered for transmission during one or more subsequent TTIs.

At TTI 3, 344 bits may remain buffered from LCH 1 (e.g., 600 bits minus the 256 bits transmitted during TTI 2), 200 bits may be (e.g., newly) buffered from LCH 2, and 1 k bits may remain buffered from LCH 3 (e.g., 3 k bits minus the 2 k bits transmitted during the TTI 1). During TTI 3, the measured RSRP may remain below the preconfigured threshold. Pursuant to the LCP procedure 300, the 200 bits buffered from LCH 2 may have priority over both the 344 bits buffered from LCH 1 and the 1 k bits buffered from LCH 3. Moreover, the 200 bits buffered from LCH 2 may support a URLLC service and may be duplicated for transmission over the RUL and SUL carriers, which may improve transmission reliability and/or latency. As such, the WTRU may select the RUL carrier (grant 1) to transmit the 200 bits buffered from LCH 2 during TTI 3 and the SUL carrier (grant 2) to transmit the same (e.g., duplicated) 200 bits buffered from LCH 2 during TTI 4. Alternatively, the WTRU may select the SUL carrier (grant 2) for transmission during TTI 3 and the RUL carrier (grant 1) for transmission during TTI 4.

At TTI 5, 344 bits may remain buffered from LCH 1 (e.g., 600 bits minus the 256 bits transmitted during TTI 2) and 1 k bits may remain buffered from LCH 3 (e.g., 3 k bits minus the 2 k bits transmitted during the TTI 1). No data may remain buffered from LCH 2 following the transmissions on the RUL and SUL carriers during TTI 3 and TTI 4. During TTI 5, the measured RSRP may be above the preconfigured threshold. Pursuant to the LCP procedure 300, the 344 bits buffered from LCH 1 may have priority over the 1 k bits buffered from LCH 3. As such, the WTRU may select the RUL carrier (grant 1) to transmit the 344 bits from LCH 1 during TTI 5, and the 1 k bits from LCH 3 may remain buffered for transmission during one or more subsequent TTIs. As shown in FIG. 4, in the event the network (e.g., the cell 200) does not successfully receive the 344 bits via the RUL carrier, the WTRU may receive a negative acknowledgment (NACK) from the network (e.g., the cell 200). The WTRU may further receive an indication (e.g., via a DCI) to retransmit the 344 bits buffered from LCH 1 via the SUL carrier during a subsequent TTI, such as TTI 6.

At TTI 6, 344 bits may remain buffered from LCH 1 (e.g., 600 bits minus the 256 bits transmitted during TTI 2) and 1 k bits may remain buffered from LCH 3 (e.g., 3 k bits minus the 2 k bits transmitted during the TTI 1). Pursuant to the LCP procedure 300, the 344 bits buffered from LCH 1 may have priority over the 1 k bits buffered from LCH 3. Moreover, the WTRU may have received signaling (e.g., via an indication in a DCI) to retransmit the 344 bits initially transmitted during TTI 5 via the SUL carrier. As such, the WTRU may select the SUL carrier (grant 2) to transmit 256 bits buffered from LCH 1 (in accordance with the example TBS of the SUL carrier) during TTI 6, and the 1 k bits from LCH 3 may remain buffered for transmission during one or more subsequent TTIs. Following TTI 6, 88 bits may remain buffered from LCH 1 (e.g., 344 bits minus the 256 bits transmitted during TTI 6) and 1 k bits may remain buffered from LCH 3 (e.g., 3 k bits minus the 2 k bits transmitted during TTI 1), assuming no new data is buffered from LCH 1, LCH 2, and/or LCH 3. The WTRU may continue to process the buffered data from LCH 1, LCH 2, and/or LCH 3 in accordance with the LCP procedure 300 after TTI 6.

Figure 5:
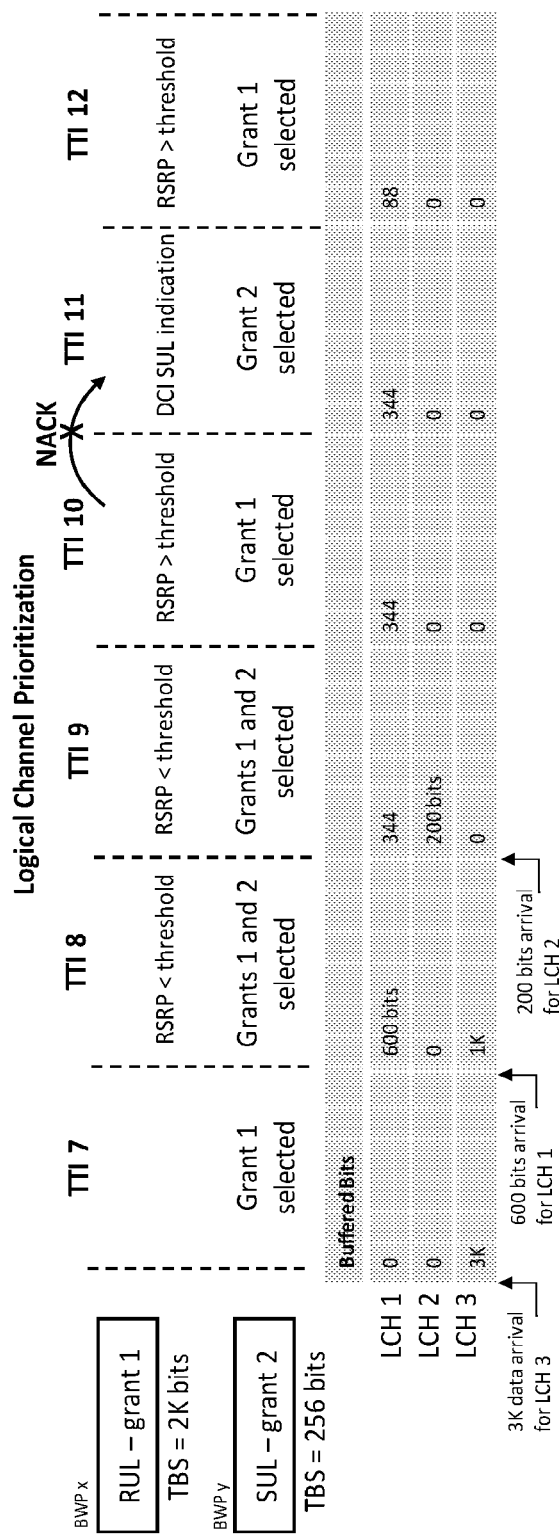
FIG. 5 illustrates an example series of TTIs during which data from one or more LCHs may be transmitted simultaneously over multiple UL carriers in accordance with the LCP procedure of FIG. 3.

FIG. 5 illustrates an example series 500 of TTIs during which data from one or more LCHs may be transmitted by the WTRU over UL carriers, such as the RUL and SUL carriers, based on the LCP procedure 300 described in connection with FIG. 3. As illustrated in FIG. 5, the WTRU may utilize the resources of the RUL and SUL carriers simultaneously (e.g., during the same TTI) based on the capabilities of the WTRU. For example, the WTRU may include two or more transmitters and may be able to transmit on different frequencies simultaneously, such as transmitting on the RUL and SUL carriers during the same TTI As shown in FIG. 5, the series 500 may include TTI 7, TTI 8, TTI 9, TTI 10, TTI 11 and TTI 12 though it will be appreciated that the series 500 may include any number of TTIs. Data may be buffered from LCH 1, LCH 2 and LCH 3 for UL transmission, though it will be further appreciated that the data may be buffered from any number of LCHs. During TTI 7, TTI 8, TTI 9, TTI 10, TTI 11 and/or TTI 12, data may be transmitted via the RUL carrier (grant 1) and/or the SUL carrier (grant 2). The RUL and SUL carriers may have TBSs of 2 k bits and 256 bits, respectively, though the TBS values of the RUL and SUL carriers shown in FIG. 5 are merely exemplary.

At TTI 7, no data may be buffered from LCH 1 or LCH 2 while 3 k bits may be (e.g., newly) buffered from LCH 3. Pursuant to the LCP procedure 300, the 3 k bits buffered from LCH 3 (e.g., the data related to eMBB) may be transmitted via the RUL carrier. As such, the WTRU may select the RUL carrier (grant 1) to transmit 2 k bits of the buffered data (in accordance with the example TBS of the RUL carrier) from LCH 3 during TTI 7.

At TTI 8, no data may be buffered from LCH 2 while 600 bits may be (e.g., newly) buffered from LCH 1 and 1 k bits may remain buffered from LCH 3 (e.g., 3 k bits minus the 2 k bits transmitted during TTI 1). Pursuant to the LCP procedure 300, the 600 bits buffered from LCH 1 may have priority over the 1 k bits buffered from LCH 3. Moreover, the 600 bits from LCH 1 may be assigned to the RUL carrier provided an attribute (e.g., the RSRP) of the RUL carrier is above a threshold. As shown in FIG. 4, the RSRP of the RUL carrier may be below the configured threshold. Accordingly, the WTRU may select the SUL carrier to transmit 256 bits of the buffered data (in accordance with the example TBS of the SUL carrier) from LCH 1 during TTI 8. The RUL carrier may be available to transmit the 1 k bits from LCH 3 during TTI 8 in the present example because the WTRU may be capable of transmitting on the RUL and SUL carriers simultaneously (e.g., during the same TTI). As such, the WTRU may also select the RUL carrier (grant 1) to transmit the 1 k bits from LCH 3 in TTI 8.

At TTI 9, 344 bits may remain buffered from LCH 1 (e.g., 600 bits minus the 256 bits transmitted during TTI 8) and 200 bits may be newly buffered from LCH 2. No data may remain buffered from LCH 3 following the transmission on the RUL carrier during TTI 8. During TTI 9, the measured RSRP may be below the preconfigured threshold. Pursuant to the LCP procedure 300, the 200 bits buffered from LCH 2 may have priority over the 344 bits buffered from LCH 1. Moreover, the 200 bits buffered from LCH 2 may support a URLLC service and may be duplicated for transmission over the RUL and SUL carriers, which may improve transmission reliability and/or latency. As such, the WTRU may select the RUL and SUL carriers (grants 1 and 2) to each transmit the 200 bits buffered from LCH 3 during TTI 9.

At TTI 10, 344 bits may remain buffered from LCH 1 (e.g., 600 bits minus the 256 bits transmitted during TTI 8). No data may remain buffered from LCH 2 or LCH 3 following the transmissions during TTI 7, TTI 8 and/or TTI 9. During TTI 10, the measured RSRP may be above the preconfigured threshold. As such, the WTRU may select the RUL carrier (grant 1) to transmit the 344 bits from LCH 1 during TTI 10. As shown in FIG. 5, in the event the network (e.g., the cell 200) does not successfully receive the 344 bits via the RUL carrier, the WTRU may receive a NACK from the network (e.g., the cell 200). The WTRU may further receive an indication (e.g., via a DCI) to retransmit the 344 bits buffered from LCH 1 via the SUL carrier during a subsequent TTI, such as TTI 11.

At TTI 11, 344 bits may remain buffered from LCH 1 (e.g., 600 bits minus the 256 bits transmitted during TTI 2). The WTRU may have received signaling (e.g., via an indication in a DCI) to retransmit the 344 bits initially transmitted during TTI 10 via the SUL carrier. As such, the WTRU may select the SUL carrier (grant 2) to transmit 256 bits buffered from LCH 1 (in accordance with the example TBS of the SUL carrier) during TTI 11.

At TTI 12, 88 bits may remain buffered from LCH 1 (e.g., 344 bits minus the 256 bits transmitted during TTI 11). During TTI 12, the measured RSRP may be above the preconfigured threshold. Accordingly, the WTRU may select the RUL carrier (grant 1) to transmit the remaining 88 bits buffered from LCH 1 during TTI 12.

The WTRU may receive control signaling (e.g., control plane signaling such as RRC signaling, or by MAC CE) that configures one or more (e.g., similar) restrictions for MAC CEs, or for a subset of MAC CEs. For example, the subset of MAC CEs may relate to higher priority and/or reliability transmission types (e.g., URLLC) and/or may relate to beam management MAC CEs. The higher priority MAC CEs may be restricted to certain types of UL access, such as the RUL and/or SUL carriers.

The WTRU may receive control signaling (e.g., control plane signaling such as RRC signaling, or by MAC CE) that configures one or more (e.g., similar) restrictions for a type of grant, such as one or more of the following: (i) a grant determined from the reception of dynamic control signaling (e.g., DCI on Physical Downlink Control Channel (PDCCH), (ii) a grant determined from a WTRU configuration or configuration type (e.g., a Type 2 UL transmission without UL grant, a semi-persistent grant), (iii) a grant determined from an activation state (e.g., whether or not the scheduling information for a grant free transmission is active/available), and/or a grant for a dedicated transmission or for a contention-based transmission. Certain types of grants may be restricted to certain types of UL access, such as the RUL and SUL carriers.

The WTRU may receive control signaling (e.g., control plane signaling such as RRC signaling, or by MAC CE) that configures one or more (e.g., similar) restrictions for one or more LCHs to be applicable for one or more portions of an LCP procedure, such as the LCP procedure 300. For example, the control signaling may indicate that steps 1 and 2 of an LCP procedure may only be applicable where resources may be allocated to satisfy a variable Bj of each LCH, with each TTI being set and updated by the LCH's Prioritized Bit Rate (PBR). A grant indicated for the SUL carrier may implement a different portion of the LCP procedure, for example, by serving all LCHs (e.g., in step 3). This may be used, for example, for throughput enhancement.

A WTRU may be configured to select and process data to be transmitted on one or more UL grants. The WTRU may determine that the WTRU has multiple received grants available, e.g., one for the RUL carrier and one for the SUL carrier for transmissions using at least partially overlapping resources in time. The WTRU may assemble a MAC PDU (e.g., using the LCP procedure 300) for each applicable transmission on the RUL and/or SUL carriers, for example, when the WTRU may be capable of simultaneous PUSCH transmissions on multiple ULs. A MAC entity may process an LCP procedure (e.g., the LCP procedure 300) for grants on a UL suitable for higher priority LCHs (e.g., first), for example, when LCHs may be configured to be prioritized or restricted on a certain UL. The MAC entity may (e.g., additionally or alternatively) process one or more grants with an aim of maximizing the overall data rate.

The WTRU may prioritize selection of available grants (e.g., via the LCP procedure 300) on the RUL and/or SUL carriers. The WTRU may prioritize the selection, for example, when it may or may not be capable of simultaneous PUSCH transmission on the RUL and SUL carriers. Prioritization may take into account, for example, one or more of the following: (i) an estimated pathloss to the RUL and/or SUL carriers (e.g., a switch to the SUL carrier may be triggered when the pathloss to RUL carrier may be below a configured threshold); (ii) PH of the RUL and/or SUL carriers (e.g., the WTRU may use the SUL carrier when PH of the RUL carrier may be below a threshold, such as 0 dB); (iii) a TBS of the SUL carrier relative to a TBS of the RUL carrier; and/or (iv) logical channels with buffered data and associated priorities (e.g., including any possible channel selection restrictions based on an LCP procedure, such as the LCP procedure 300).

Examples of prioritizing available grants based on a TBS of the SUL carrier relative to a TBS of the RUL carrier may, for example, include: (i) a UL grant(s) on the RUL carrier or the SUL carrier may be selected when a MAC PDU produced by a MAC multiplexing and assembly entity may fit on either the RUL carrier or the SUL carrier without segmentation; (ii) a UL grant(s) on the RUL carrier or the SUL carrier may be selected to maximize an amount of data that may be sent by the WTRU in a (e.g., current) TTI; and/or (iii) a UL grant(s) on the RUL carrier or the SUL carrier may be selected to maximize an amount of high priority data that may be sent by the WTRU in a (e.g., current) TTI.

In an example of LCHs with buffered data and associated priorities, certain LCHs may be configured with selection restrictions. A MAC entity may, for example, select one or more UL grants that may be associated with higher priority LCHs, or that may maximize an amount of data that may be sent by the WTRU in a (e.g., current) TTI.

A MAC entity may, for example, include a HARQ entity for a (e.g. each) serving cell with a configured UL and may maintain a parallel HARQ process for a (e.g., each) serving cell.

HARQ may be modeled in multiple (e.g., two) different ways, for example, when the SUL carrier may be configured in the WTRU.

As noted above, the RUL and/or SUL carriers may be part of the same serving cell. The RUL and/or SUL carriers may, for example, share the same HARQ entity. A common set of HARQ processes within a (e.g., one) HARQ entity may be used for the RUL and/or SUL carriers. A gNB may configure a subset of HARQ processes that may be identified with the RUL and/or SUL carriers. Cross-uplinks retransmission may be possible, for example, when there may be switching between the RUL and SUL carriers.

The RUL and SUL carriers may be deemed separate carriers and may have separate HARQ entities. The RUL and SUL carriers may (e.g., in either modeling example) have a separate HARQ configuration, such as HARQ timeline values (e.g., maxHARQ-Tx, maxHARQ-Msg3Tx).

Single or separate HARQ processes may be used between multiple ULs, for example, for a WTRU that may be capable of (e.g., fast) switching between the RUL and SUL carriers. In an example, the WTRU may be configured with multiple (e.g., two) configured grants (e.g., SPS resources) on the RUL and SUL carriers. Resources of an applicable configured grant may be used, for example, when a switching event may be triggered. TB retransmissions between multiple ULs may be possible, for example, when a (e.g. single) HARQ process may be used for UL transmission spanning multiple UL carriers, such as the RUL and SUL carriers.

A WTRU configured with multiple ULs with a certain number of HARQ retransmissions may result in different WTRU behavior. In an example, retransmissions on the SUL carrier may occur, for example, after a certain (e.g., threshold) number of UL HARQ transmissions using the RUL carrier. In an additional or alternative example, an SR may be triggered to request a UL-SCH resource on the SUL carrier, for example, when the WTRU (e.g., without UL-SCH resources on the SUL carrier) may reach a threshold number of UL HARQ transmissions using the RUL carrier.

The WTRU may use the RUL and/or SUL carriers, for example, for HARQ feedback reporting for DL transmissions. In an example, the WTRU may select the RUL and/or SUL carriers based on DL and/or UL measurements. The SUL carrier may be used (e.g. regardless), or a selection between the RUL and SUL carriers may be based on, DL pathloss measurements, for example, when the RUL and SUL may be active (e.g., available). The WTRU may select to report feedback on a certain UL or BWP based on a semi-static configuration or a dynamic indication from the network (e.g., the cell 200).

The WTRU may use the SUL carrier to send feedback to a gNB, for example, due to a change of propagation conditions that may have prevented the WTRU from successfully sending the feedback on the RUL carrier. In an example, the WTRU may (e.g., autonomously) switch to PUCCH on the SUL carrier or may receive an indication by the gNB to do so. The gNB may send the indication to the WTRU to switch to PUCCH on the SUL carrier, for example, when the gNB may not (e.g., timely) receive an expected feedback on the RUL carrier from the WTRU. Feedback may or may not be aggregated for a number of DL TBs.

In an additional or alternative example, the WTRU may transmit HARQ feedback on the RUL carrier. The WTRU may store a HARQ acknowledgment (ACK) value, for example, upon transmitting the value on the RUL carrier. The WTRU may be polled, for example, to transmit multiple (e.g., previously transmitted) HARQ-ACK values on the SUL carrier. The WTRU may remove stored values, for example, upon expiration of a timer, upon being polled for a value on the SUL carrier and/or upon retransmission of a TB.

The WTRU may use packet duplication and routing. The WTRU may be configured with one or more UL carriers for a given cell, such as the RUL and SUL carriers. The WTRU may determine that multiple UL carriers may be available for UL transmission, e.g., configured, activated or based on scheduling information. The WTRU may determine that the multiple UL carriers may be concurrently active. The WTRU may be configured to activate packet duplication when the WTRU determines that multiple UL carriers are activated concurrently.

The WTRU may be configured for activating packet duplication when the WTRU determines that multiple BWPs are activated concurrently, e.g., whether the BWPs are configured for packet duplication and/or after receiving an activation indication from the network (e.g., the cell 200).

The WTRU may activate packet duplication for (e.g., robust) handover. For example, the WTRU may be configured to transmit duplicate PDUs to the target and source cells during handover. In an example, the WTRU may transmit the duplicate PDUs using the SUL carrier of the source cell and the RUL carrier of the target cell. The WTRU may transmit the duplicate PDUs using the RUL carrier of the source cell and the SUL carrier of the target cell. The activation of packet duplication may depend on the content of the handover command.

The WTRU may determine whether duplication is needed or not needed based on one or more attributes of the wireless system, such as radio (e.g., carrier) conditions determined by measurements. For example, when the WTRU is configured with both the RUL and SUL carriers in a given cell, the WTRU may activate duplication (e.g., only) if the measured cell quality (e.g., the RSRP of the RUL and/or SUL carriers) is below a pre-defined threshold.

A WTRU may be configured to perform PDCP duplication, for example for one or more PDUs associated with one or more logical channels. The WTRU may activate duplication in PDCP. For example, the WTRU may determine that a plurality of UL carriers (e.g., the RUL and SUL carriers) are activated for a given cell (e.g., the cell 200) from the reception of control signaling, such as by L1/PDCCH, L2 MAC CE or RRC entity. The WTRU may determine duplication based on semi-static, dynamic activation signaling, or a combination of both.

When the WTRU performs packet duplication, the WTRU may: (i) duplicate PDCP data PDUs for one or more specific radio bearers (e.g., radio bearers can be dynamically indicated by the network, semi-statically configured, or statically configured based on service or QoS requirements); (ii) duplicate SRBs; (iii) duplicate specific messages (e.g., measurement reports, including those for beam management purposes); and/or (iv) duplicate SDUs for which the PDCP SDU discard timer is less than a specific threshold. The WTRU may determine to do any of (i)-(iv) based on a configuration and/or the reception of a duplication activation indication received by the WTRU (e.g., by DCI, MAC CE, and/or RRC signaling) via the network (e.g., the cell 200).

The WTRU may determine to duplicate one or more packets based on receiving a PDCP SR (e.g., the WTRU may apply duplication for specific PDUs as a function of the received PDCP SR). The WTRU may determine that a number of PDUs may be retransmitted from the PDCP SR, and the WTRU may determine that the WTRU should perform duplication for such PDUs. The WTRU may initiate cumulative retransmissions (e.g., where the switch implies a MAC reset) and may apply duplication for (e.g., all) the cumulatively retransmitted PDUs.

The WTRU may not be able to transmit on multiple UL carriers (e.g., the RUL and SUL carriers) and BWPs simultaneously. This may be due to one or more of the following attributes: (i) received configuration signaling, (ii) WTRU capabilities, and/or (iii) radio conditions and measurements. As such, switching between UL carriers and/or BWPs may be dependent on the foregoing attributes.

PDCP routing may depend on the WTRU receiving a PDCP Status Report (SR). For example, the WTRU may select a UL or BWP for specific PDUs based on the received PDCP SR (e.g., the WTRU may determine that a number of PDUs may be retransmitted from the PDCP SR, and select the same or different UL or BWP for such PDUs). The WTRU may initiate cumulative retransmissions (e.g., in case the switch implies a MAC reset) and may select the same or different UL or BWP for all the cumulatively retransmitted PDUs.

The WTRU may use HARQ-based duplication and routing. The activation of the RUL and SUL carriers concurrently may activate HARQ based duplication for a certain HARQ, which may be configured with duplication. HARQ may transmit duplicates of the TB on the RUL and SUL carriers, e.g., simultaneously or in succession. HARQ may transmit duplicates of the TB on the RUL and SUL carriers due to the activation of more than one BWP. Duplication may be semi-static or dynamic activation signaling, or a combination of both.

The WTRU may determine to use simultaneous HARQ based duplication based on receiving a grant on the SUL carrier together with a grant on the RUL carrier. The grant on the SUL carrier may be pre-configured. The timing of the configured grant may be relative to that of the grant for the RUL carrier.

The WTRU may determine whether to use duplication based on the signaled RV of the retransmission. For example, the WTRU may activate HARQ based duplication if the RV is above a certain number.

The WTRU may determine whether to use duplication based on the numerologies or physical layer traits of the different BWPs or UL carriers. For example, HARQ based duplication may be activated if the numerologies of the BWPs or UL carriers are the same.

The WTRU may determine to activate duplication on more than one BWP based on a BWP of a different numerology from that of the BWP used for the initial transmission. For example, for a retransmitted TB, the TB may be retransmitted on the BWP on which the initial transmission took place and the same TB may be transmitted on the newly activated BWP, e.g., either as a retransmission with an updated RV on the same HARQ or as a new transmission on a separate HARQ. The WTRU may determine to activate duplication due to the activation of one or more SUL carriers, which may have different numerologies or subcarrier spacings.

The WTRU may transmit duplicates of a given TB by staggering the transmissions in the time domain, such as over symbols in the same slot, over symbols in different slots, or symbols in different TTIs. This may be useful in the case of a WTRU that may not be able to perform simultaneous transmissions, e.g. based on the WTRU's capabilities, one or more configuration aspects, and/or the numerologies involved.

The WTRU may use HARQ routing. The WTRU may not be able to transmit on the RUL and SUL carriers, or more than one BWP, simultaneously. Switching between UL carriers or BWPs may depend on attributes, such as the WTRU's capabilities.

For transmissions of a (e.g., new) TB, the network may provide part of the scheduling/HARQ information, indicating which UL carrier or BWP that grant belongs to.

For retransmissions, if the WTRU is not capable of retransmissions on a different numerology, and the SUL carrier, or a BWP, of a numerology different than that of the initial transmission becomes active prior to receiving an ACK for the TB, the WTRU may: (i) remain on the UL carrier or BWP on which the initial transmission was made until the ACK is received for the TB; (ii) remain on the UL carrier or BWP on which the initial transmission was made until the ACK is received for the TB or the retransmissions of the relevant TB are completed successfully, such as when the WTRU has a grant on the UL carrier or the BWP used for the initial transmission; and/or (iii) switch to the SUL carrier or new BWP (e.g., if a NACK is received, the WTRU may send an SR using an SR configuration that distinguishes the numerology of the initial transmission).

For retransmissions, if the RSRP is less than a configured threshold and a configured number of retransmissions or a configured RV number-has been reached, the WTRU may perform random access using the SUL carrier to obtain a grant for the retransmission. The WTRU may send an SR using the appropriate configuration to obtain a grant on the SUL carrier to perform the retransmission, e.g., depending on the service, QoS of the data retransmitted, or the priority of the involved LCHs.

A WTRU may be configured for transmitting over multiple UL carriers (e.g., RUL and SUL carriers) in wireless systems. Activation, selection, initiation and/or switching of such UL carriers may be, for example, static, semi-static, dynamic, pre-configured, reconfiguration-based, network controlled and/or WTRU-initiated. The WTRU may be configured for HARQ processing, for example, upon activation of the SUL carrier and/or switching between the RUL and SUL carriers. The WTRU may be configured with LCP procedures for UL-SCH grants on the RUL and/or SUL carriers. The WTRU may be configured for PDCP duplication and/or routing towards the RUL and/or SUL carriers, for example, for a signaling radio bearer (SRB), radio bearers, specific messages and/or a SDU. The WTRU may be configured with HARQ-based duplication and/or multiple grants on the UL carriers. The timing of the grant on an SUL carrier, for example, may be relative to the timing of a grant on the RUL carrier.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g. WTRU and network) to accomplish the described functions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), comprising a processor and memory, the processor and memory configured to:
   receive configuration information, the configuration information indicating that data corresponding to a first set of one or more logical channels can be transmitted using a first type of uplink (UL) grant and that data corresponding to a second set of one or more logical channels can be transmitted using a second type of UL grant;
   receive a first UL grant and a second UL grant, wherein the first UL grant and the second UL grant at least partially overlap in a time domain, the first UL grant corresponds to the first type of UL grant, and the second UL grant corresponds to the second type of UL grant;
   determine that the first set of one or more logical channels comprises a first logical channel that has data available for transmission, the first logical channel being associated with a first priority;
   determine that the second set of one or more logical channels comprises a second logical channel that has data available for transmission, the second logical channel being associated with a second priority, the first priority being higher than the second priority;
   prioritize the first UL grant over the second UL grant based on the first priority being higher than the second priority; and
   transmit data associated with the first set of one or more logical channels in accordance with the first UL grant based on prioritizing the first UL grant over the second UL grant.

2. The WTRU of claim 1, wherein the processor and memory being configured to prioritize the first UL grant over the second UL grant comprises the processor and memory being configured to ignore the second UL grant.

3. The WTRU of claim 1, wherein the processor and memory are configured to receive at least one of the first or second UL grant via radio resource control (RRC) signaling.

4. The WTRU of claim 1, wherein the processor and memory are configured to receive at least one of the first or second UL grant via downlink control information (DCI).

5. The WTRU of claim 1, wherein the first logical channel corresponds to a highest priority logical channel with data available for transmission of the first set of one or more logical channels, and the second logical channel corresponds to a highest priority logical channel with data available for transmission of the second set of one or more logical channels.

6. The WTRU of claim 1, wherein the first UL grant is associated with a first UL transmission resource and the second UL grant is associated with a second UL transmission resource.

7. The WTRU of claim 1, wherein the processor and memory are configured to receive the configuration information in a radio resource control (RRC) message.

8. The WTRU of claim 1, wherein at least one of the first UL grant or the second UL grant is a configured grant.

9. A method implemented by a wireless transmit receive unit (WTRU), the method comprising:
  receiving configuration information, the configuration information indicating that data corresponding to a first set of one or more logical channels can be transmitted using a first type of uplink (UL) grant and that data corresponding to a second set of one or more logical channels can be transmitted using a second type of UL grant;
  receiving a first UL grant and a second UL grant, wherein the first UL grant and the second UL grant at least partially overlap in a time domain, the first UL grant corresponds to the first type of UL grant, and the second UL grant corresponds to the second type of UL grant;
  determining that the first set of one or more logical channels comprises a first logical channel that has data available for transmission, the first logical channel being associated with a first priority;
  determining that the second set of one or more logical channels comprises a second logical channel that has data available for transmission, the second logical channel being associated with a second priority, the first priority being higher than the second priority;
  prioritizing the first UL grant over the second UL grant based on the first priority being higher than the second priority; and
  transmitting data associated with the first set of one or more logical channels in accordance with the first UL grant based on prioritizing the first UL grant over the second UL grant.

10. The method of claim 9, wherein prioritizing the first UL grant over the second UL grant comprises ignoring the second UL grant.

11. The method of claim 9, wherein at least one of the first or second UL grant is received via radio resource control (RRC) signaling.

12. The method of claim 9, wherein at least one of the first or second UL grant is received via downlink control information (DCI).

13. The method of claim 9, wherein the first logical channel corresponds to a highest priority logical channel with data available for transmission of the first set of one or more logical channels, and the second logical channel corresponds to a highest priority logical channel with data available for transmission of the second set of one or more logical channels.

14. The method of claim 9, wherein the first UL grant is associated with a first UL transmission resource and the second UL grant is associated with a second UL transmission resource.

15. The method of claim 9, wherein the configuration information is received in a radio resource control (RRC) message.

16. The method of claim 9, wherein at least one of the first UL grant or the second UL grant is a configured grant.

* * * * *